(12) United States Patent
Herscovici et al.

(10) Patent No.: US 8,930,350 B1
(45) Date of Patent: Jan. 6, 2015

(54) AUTOCOMPLETION USING PREVIOUSLY SUBMITTED QUERY DATA

(75) Inventors: Michael Herscovici, Haifa (IL); Dan Guez, Hof Ashkelon (IL); Hyung-Jin Kim, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 353 days.

(21) Appl. No.: 12/730,136

(22) Filed: Mar. 23, 2010

Related U.S. Application Data (60) Provisional application No. 61/162,542, filed on Mar. 23, 2009.

(51) Int. Cl.
 *G06F 17/30* (2006.01)
 *G06F 15/16* (2006.01)

(52) U.S. Cl.
 USPC .......................................... 707/723; 707/751

(58) Field of Classification Search
 None
 See application file for complete search history.

(56) References Cited

U.S. PATENT DOCUMENTS

| | | | |
|---|---|---|---|
| 6,006,222 A | 12/1999 | Culliss | |
| 6,014,665 A | 1/2000 | Culliss | |
| 6,078,916 A | 6/2000 | Culliss | |
| 6,182,068 B1 | 1/2001 | Culliss | |
| 6,539,377 B1 | 3/2003 | Culliss | |
| 6,816,850 B2 | 11/2004 | Culliss | |
| 7,725,485 B1 | 5/2010 | Sahami et al. | |
| 7,844,599 B2 | 11/2010 | Kasperski et al. | |
| 7,921,107 B2 | 4/2011 | Chang et al. | |
| 7,984,004 B2 | 7/2011 | Andrew et al. | |
| 8,065,316 B1 | 11/2011 | Baker et al. | |
| 8,122,011 B1 | 2/2012 | Garg et al. | |
| 8,412,727 B1 | 4/2013 | Das et al. | |
| 8,583,675 B1 | 11/2013 | Haahr et al. | |
| 2004/0186827 A1 | 9/2004 | Anick et al. | |
| 2006/0010126 A1 | 1/2006 | Anick et al. | |
| 2006/0026147 A1* | 2/2006 | Cone et al. | 707/3 |
| 2006/0047649 A1 | 3/2006 | Liang | |
| 2008/0091670 A1 | 4/2008 | Ismalon | |
| 2009/0119248 A1 | 5/2009 | Sundaresan et al. | |
| 2009/0119261 A1 | 5/2009 | Ismalon | |
| 2010/0114929 A1 | 5/2010 | Bonchi et al. | |
| 2010/0211588 A1 | 8/2010 | Jiang et al. | |
| 2011/0238608 A1 | 9/2011 | Sathish | |

OTHER PUBLICATIONS

Joachims, "Evaluating Search Engines Using Clickthrough Data", Cornell University, Department of Computer Science, Draft, Feb. 19, 2002, 13 pages.
Joachims; Optimizing search engines using clickthrough data; 2002; Proceedings of the ACM SIGKDD International Conference on Knowledge Discovery and Data Mining, p. 133-142, 10 pages.
Jansen et al., "An Analysis of Web Documents Retrieved and Viewed", School of Information Sciences and Technology, The Pennsylvania State University, the 4$^{th}$ International Conference on Internet Computing, Las Vegas, Nevada, pp. 65-69, Jun. 23-26, 2003, 5 pages.

* cited by examiner

*Primary Examiner* — Alex Gofman
(74) *Attorney, Agent, or Firm* — Fish & Richardson P.C.

(57) ABSTRACT

A computer-implemented method for processing query information includes receiving query information at a server system. The query information includes a portion of a query from a search requestor. The method also includes obtaining a set of predicted queries relevant to the portion of the search requestor query based upon the portion of the query from the search requestor and data indicative of search requestor behavior relative to previously submitted queries. The method also includes providing the set of predicted queries to the search requestor.

32 Claims, 9 Drawing Sheets

AUTOCOMPLETION USING PREVIOUSLY SUBMITTED QUERY DATA

CLAIM OF PRIORITY

This application claims priority under 35 USC §119(e) to U.S. Patent Application Ser. No. 61/162,542, filed on Mar. 23, 2009, the entire contents of which are hereby incorporated by reference.

BACKGROUND

The present disclosure relates to using previously submitted query data to anticipate a user's search request.

Internet search engines aim to identify documents or other items that are relevant to a user's needs and to present the documents or items in a manner that is most useful to the user. Such activity often involves a fair amount of mind-reading—inferring from various clues what the user wants. Certain clues may be user specific. For example, knowledge that a user is making a request from a mobile device, and knowledge of the location of the device, can result in much better search results for such a user.

Clues about a user's needs may also be more general. For example, search results can have an elevated importance, or inferred relevance, if a number of other search results link to them. If the linking results are themselves highly relevant, then the linked-to results may have a particularly high relevance. Such an approach to determining relevance may be premised on the assumption that, if authors of web pages felt that another web site was relevant enough to be linked to, then web searchers would also find the site to be particularly relevant. In short, the web authors "vote up" the relevance of the sites.

Other various inputs may be used instead of, or in addition to, such techniques for determining and ranking search results. For example, user reactions to particular search results or search result lists may be gauged, so that results on which users often click will receive a higher ranking. The general assumption under such an approach is that searching users are often the best judges of relevance, so that if they select a particular search result, it is likely to be relevant, or at least more relevant than the presented alternatives.

SUMMARY

Systems, methods, and apparatus including computer program products for anticipating user search requests are described. In general, one or more aspects of the subject matter described in this specification can be embodied in one or more methods for processing query information. The methods include receiving query information at a server system. The query information includes a portion of a query from a search requestor. The methods also include obtaining a set of predicted queries relevant to the portion of the search requestor query based upon the portion of the query from the search requestor and data indicative of search requestor behavior relative to previously submitted queries. The methods also include providing the set of predicted queries to the search requestor. Other embodiments of this aspect include corresponding systems, apparatus and computer program products.

These and other embodiments can optionally include one or more of the following features. Obtaining the set of predicted queries may include ordering the set of predicted queries based upon a ranking criteria. The ranking criteria may be based upon the data indicative of search requestor behavior relative to previously submitted queries. The data indicative of search requestor behavior relative to previously submitted queries may include click data, location-specific data, language-specific data, or other similar types of data. The methods may further include receiving input from the search requestor identifying a selected query from the set of predicted queries, obtaining search results based upon the selected query, and providing the search results to the search requestor. The portion of a query from a search requestor may be defined by at least one delimiter, one search term, a predefined number of characters, or other similar type of data.

Particular embodiments of the described subject matter can be implemented to realize one or more of the following advantages. A search assistant receives query information from a search requestor, prior to the requestor indicating completion of inputting the query. Additionally information associated with previous user (or users) searches (such as click data associated with search results) is collected. From the received query information and the previous search information, a set of predicted queries is produced and provided to the search requestor for presentation.

The details of one or more implementations are set forth in the accompanying drawings and the description below. Other features, aspects, and advantages will become apparent from the description, the drawings, and the claims.

DESCRIPTION OF THE DRAWINGS

Like reference numbers and designations in the various drawings indicate like elements.

DETAILED DESCRIPTION

Figure 1:
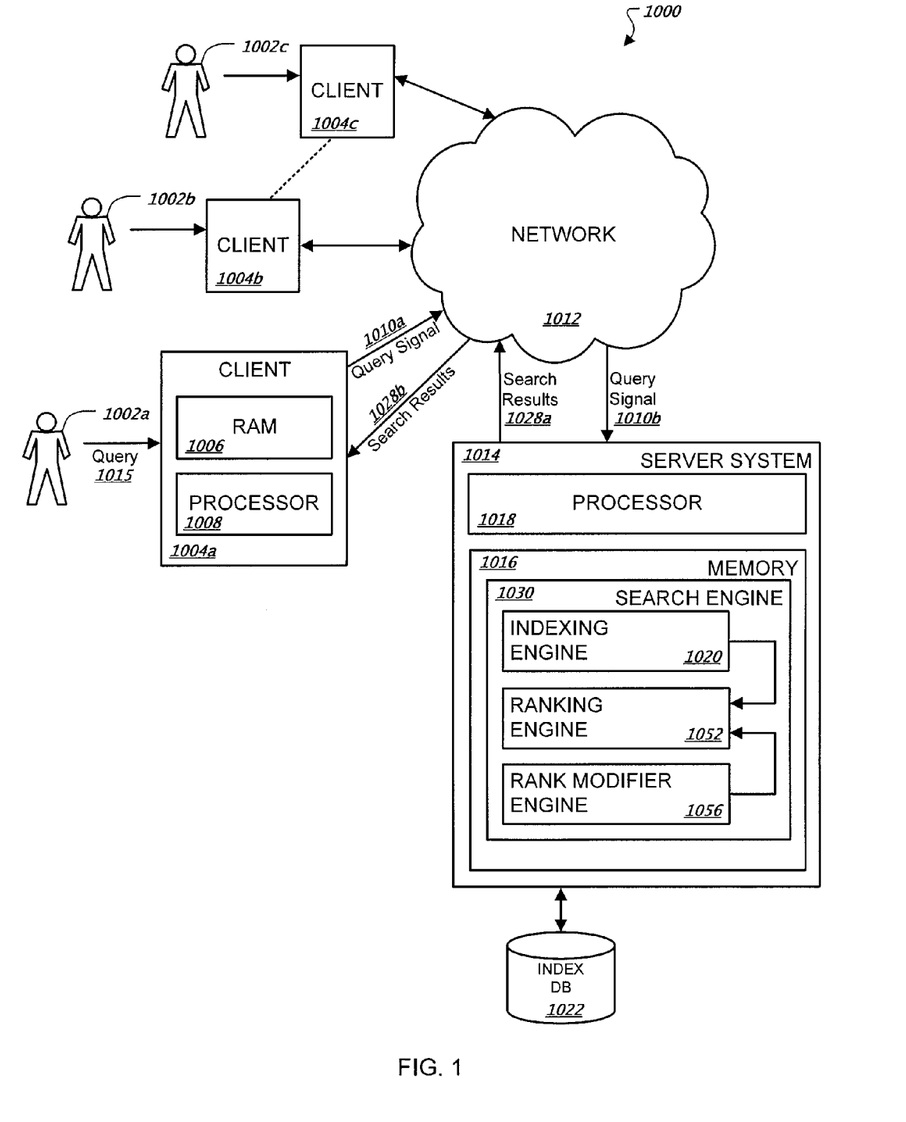
FIG. 1 shows an example information retrieval system in which the relevance of results obtained for submitted search queries can be improved.

FIG. 1 shows an example system 1000 for improving the relevance of results obtained from submitting search queries as can be implemented in an internet, intranet, or other client/server environment. The system 1000 is an example of an information retrieval system in which the systems, components and techniques described below can be implemented. Although several components are illustrated, there may be fewer or more components in the system 1000. Moreover, the components can be distributed on one or more computing devices connected by one or more networks or other suitable communication mediums.

A user 1002 (1002*a*, 1002*b*, 1002*c*) can interact with the system 1000 through a client device 1004 (1004*a*, 1004*b*, 1004*c*) or other device. For example, the client device 1004 can be a computer terminal within a local area network (LAN)

or wide area network (WAN). The client device 1004 can include a random access memory (RAM) 1006 (or other memory and/or a storage device) and a processor 1008. The processor 1008 is structured to process instructions within the system 1000. In some implementations, the processor 1008 is a single-threaded processor. In other implementations, the processor 1008 is a multi-threaded processor. The processor 1008 can include multiple processing cores and is structured to process instructions stored in the RAM 1006 (or other memory and/or a storage device included with the client device 1004) to display graphical information for a user interface.

A user 1002*a* can connect to a search engine 1030 within a server system 1014 to submit a query 1015. When the user 1002*a* submits the query 1015 through an input device attached to a client device 1004*a*, a client-side query signal 1010*a* is sent into a network 1012 and is forwarded to the server system 1014 as a server-side query signal 1010*b*. Server system 1014 can be one or more server devices in one or more locations. The server system 1014 includes a memory device 1016, which can include the search engine 1030 loaded therein. A processor 1018 is structured to process instructions within the system 1014. These instructions can implement one or more components of the search engine 1030. The processor 1018 can be a single-threaded processor or a multi-threaded processor, and can include multiple processing cores. The processor 1018 can process instructions stored in the memory 1016 related to the search engine 1030 and can send information to the client device 1004, through the network 1012, to create a graphical presentation in a user interface of the client device 1004 (e.g., a search results web page displayed in a web browser).

The server-side query signal 1010*b* is received by the search engine 1030. The search engine 1030 uses the information within the user query 1015 (e.g. query terms) to find relevant documents. The search engine 1030 can include an indexing engine 1020 that actively searches a corpus (e.g., web pages on the Internet) to index the documents found in that corpus, and the index information for the documents in the corpus can be stored in an index database 1022. This index database 1022 can be accessed to identify documents related to the user query 1015. Note that, an electronic document (which for brevity will simply be referred to as a document) does not necessarily correspond to a file. A document can be stored in a portion of a file that holds other documents, in a single file dedicated to the document in question, or in multiple coordinated files.

The search engine 1030 can include a ranking engine 1052 to rank the documents related to the user query 1015. The ranking of the documents can be performed using traditional techniques for determining an information retrieval (IR) score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. The technique is exemplified in some systems that treat a link from one web page to another as an indication of quality for the latter page, so that the page with the most such quality indicators is rated higher than others. Appropriate techniques can also be used to identify and eliminate attempts to cast false votes so as to artificially drive up the relevance of a page.

To further improve such traditional document ranking techniques, the ranking engine 1052 can receive an additional signal from a rank modifier engine 1056 to assist in determining an appropriate ranking for the documents. The rank modifier engine 1056 provides one or more prior models, or one or more measures of relevance for the documents based on one or more prior models, which can be used by the ranking engine 1052 to improve the search results' ranking provided to the user 1002. In general, a prior model represents a background probability of document result selection given the values of multiple selected features, as described further below. The rank modifier engine 1056 can perform one or more of the operations described below to generate the one or more prior models, or the one or more measures of relevance based on one or more prior models.

The search engine 1030 can forward the final, ranked result list within a server-side search results signal 1028*a* through the network 1012. Exiting the network 1012, a client-side search results signal 1028*b* can be received by the client device 1004*a* where the results can be stored within the RAM 1006 and/or used by the processor 1008 to display the results on an output device for the user 1002*a*.

Figure 2:
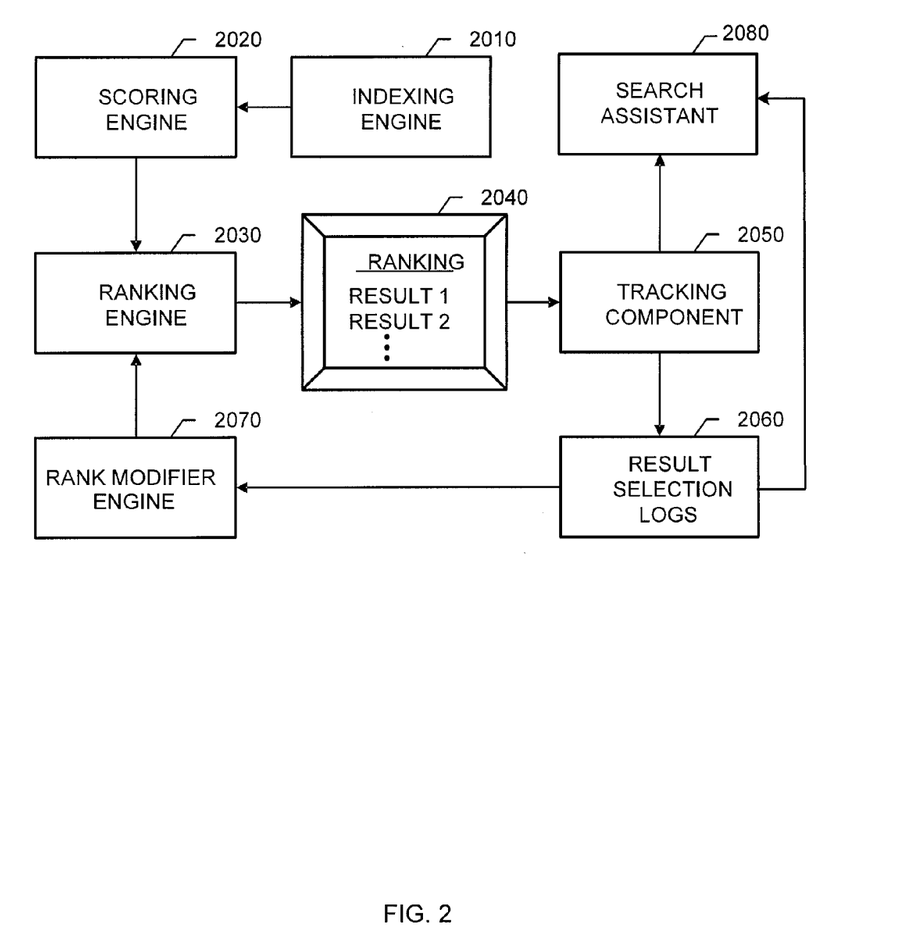
FIG. 2 shows example components of an information retrieval system.

FIG. 2 shows example components of an information retrieval system. These components can include an indexing engine 2010, a scoring engine 2020, a ranking engine 2030, and a rank modifier engine 2070. The indexing engine 2010 can function as described above for the indexing engine 1020. In addition, the scoring engine 2020 can generate scores for document results based on many different features, including content-based features that link a query to document results, and query-independent features that generally indicate the quality of document results. The content-based features can include aspects of document format, such as query matches to title or anchor text in an HTML (Hyper Text Markup Language) page. The query-independent features can include aspects of document cross-referencing, such as a rank of the document or the domain. Moreover, the particular functions used by the scoring engine 2020 can be tuned, to adjust the various feature contributions to the final IR score, using automatic or semi-automatic processes.

The ranking engine 2030 can produce a ranking of document results 2040 for display to a user based on IR scores received from the scoring engine 2020 and one or more signals from the rank modifier engine 2070. A tracking component 2050 can be used to record information regarding individual user selections of the results presented in the ranking 2040. For example, the tracking component 2050 can be embedded JavaScript code included in a web page ranking 2040 that identifies user selections (clicks) of individual document results and also identifies when the user returns to the results page, thus indicating the amount of time the user spent viewing the selected document result. In other implementations, the tracking component 2050 can be a proxy system through which user selections of the document results are routed, or the tracking component can include pre-installed software at the client (e.g., a toolbar plug-in to the client's operating system). Other implementations are also possible, such as by using a feature of a web browser that allows a tag/directive to be included in a page, which requests the browser to connect back to the server with message(s) regarding link(s) clicked by the user.

The recorded information can be stored in result selection log(s) 2060. The recorded information can include log entries that indicate, for each user selection, the query (Q), the document (D), the time (T) on the document, the language (L) employed by the user, and the country (C) where the user is likely located (e.g., based on the server used to access the IR system). Other information can also be recorded regarding user interactions with a presented ranking, including negative information, such as the fact that a document result was presented to a user, but was not clicked, position(s) of click(s) in the user interface, IR scores of clicked results, IR scores of all results shown before the clicked result, the titles and snippets shown to the user before the clicked result, the user's cookie, cookie age, IP (Internet Protocol) address, user agent of the browser, etc. Still further information can be recorded, such as described below during discussion of the various features that can be used to build a prior model. Moreover, similar information (e.g., IR scores, position, etc.) can be recorded for an entire session, or multiple sessions of a user, including potentially recording such information for every click that occurs both before and after a current click.

The information stored in the result selection log(s) 2060 can be used by the rank modifier engine 2070 in generating the one or more signals to the ranking engine 2030. In general, a wide range of information can be collected and used to modify or tune the click signal from the user to make the signal, and the future search results provided, a better fit for the user's needs. Thus, user interactions with the rankings presented to the users of the information retrieval system can be used to improve future rankings. In some arrangements, the user interaction data may be provided to one or more server systems (e.g., server system 1014) for use and storage (e.g., database 1022) for later retrieval.

The information stored in the results selection log(s) 2060 along with the information collected by the tracking component 2050 may also be accessible by a search assistant 2080, which is also a component of the information retrieval system. Along with receiving information from the these components, the search assistant 2080 is capable of monitoring a user's entry of a search query. Upon receiving a partial search query, the query along with the information (e.g., click data) from the tracking component 2050 and the results selection log(s) 2060 is used to predict the user's contemplated complete query. Further, based upon this information, the predictions may be ordered according to one or more ranking criteria prior to being presented to assist the user in completing the query.

The components shown in FIG. 2 can be combined in various manners and implemented in various system configurations. For example, the scoring engine 2020 and the ranking engine 2030 can be merged into a single ranking engine, such as the ranking engine 1052 of FIG. 1. The rank modifier engine 2070 and the ranking engine 2030 can also be merged, and in general, a ranking engine includes any software component that generates a ranking of document results after a query. Moreover, a ranking engine can be included in a client system in addition to (or rather than) in a server system.

Figure 3:
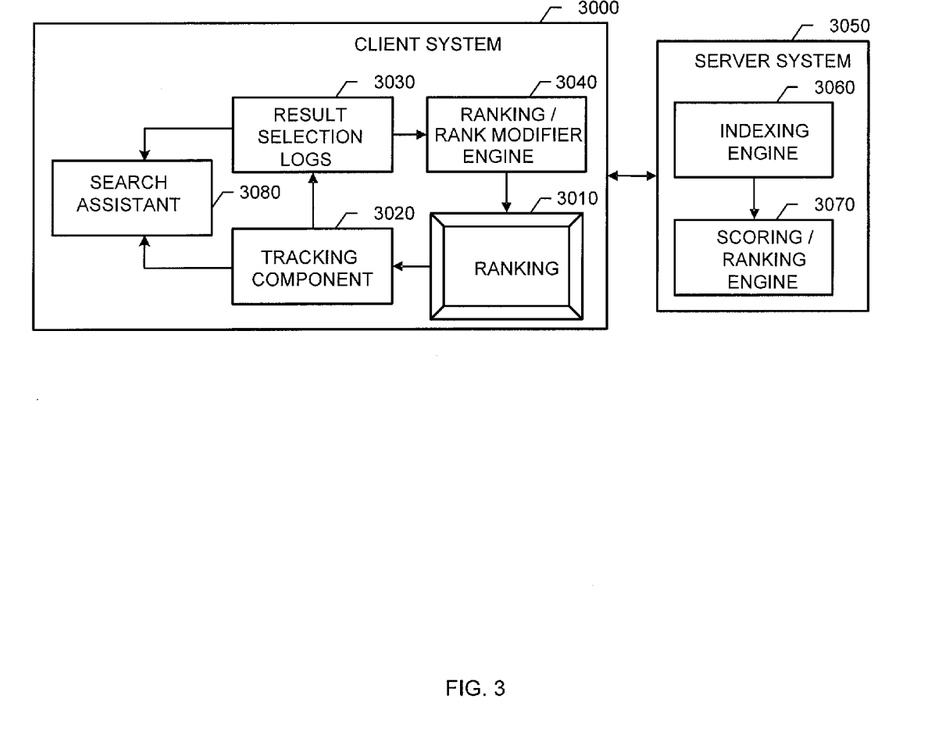
FIG. 3 shows another example information retrieval system.

FIG. 3 shows another example information retrieval system. In this system, a server system 3050 includes an indexing engine 3060 and a scoring/ranking engine 3070. A client system 3000 includes a user interface for presenting a ranking 3010, a tracking component 3020, result selection log(s) 3030 and a ranking/rank modifier engine 3040. For example, the client system 3000 can include a company's enterprise network and personal computers, in which a browser plug-in incorporates the ranking/rank modifier engine 3040. When an employee in the company initiates a search on the server system 3050, the scoring/ranking engine 3070 can return the search results along with either an initial ranking or the actual IR scores for the results. The browser plug-in can then re-rank the results locally based on tracked page selections for the company-specific user base.

The information retrieval system also includes a search assistant 3080 that is capable of monitoring a user's entry of a search query to receive a partial (or complete) search query. Additionally, the search assistant 3080 can collect information from the results selection log(s) 3030 along with the information collected by the tracking component 3020.

As mentioned above, portions of a user's query can be collected (e.g., by the search assistant 3080) and transmitted to a search engine before the user has finished entering the complete query. The search engine uses the transmitted portion of the query to predict the user's final query. These predictions are transmitted back and provided to the user. If one of the predictions is the user's intended query, then the user can select that predicted query without having to complete entry of the query. In some arrangements, the selected query is transmitted to the search engine, which similar to a completely entered query, initiates a set of query results corresponding to the selected query to be returned.

Figure 4:
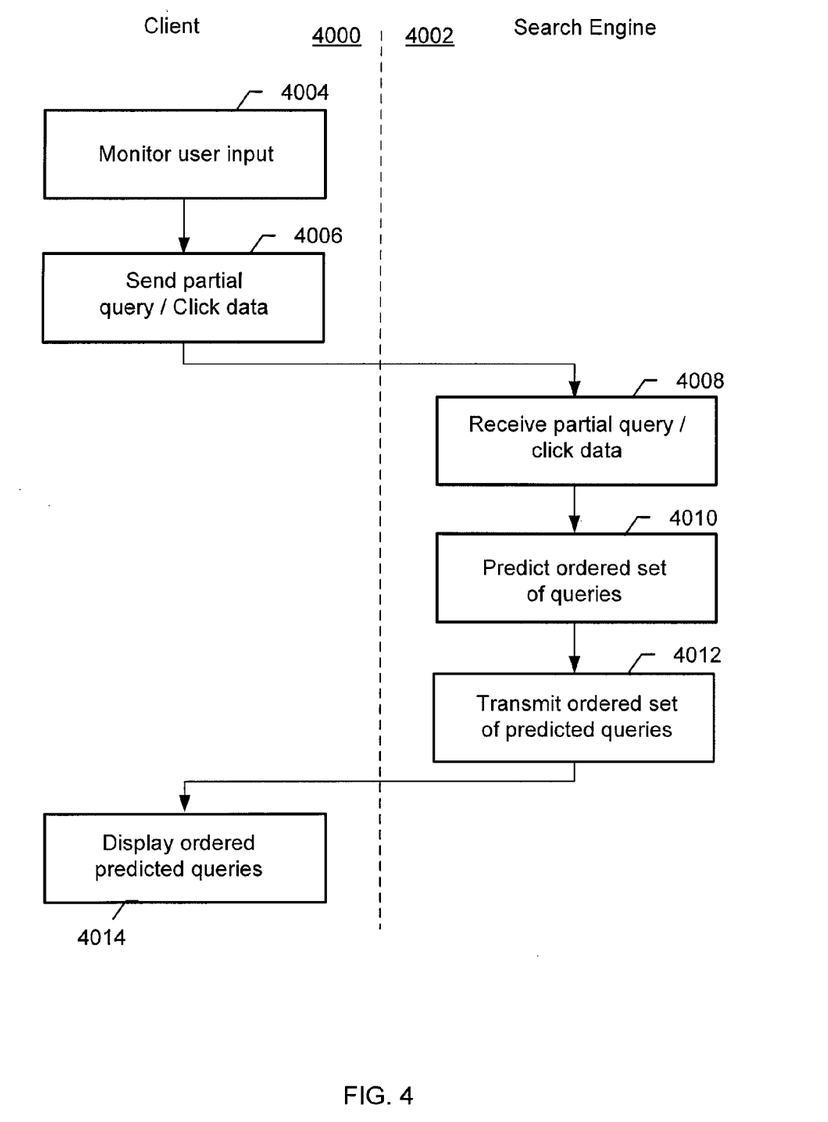
FIG. 4 shows a flowchart for predicting queries for search requestors.

FIG. 4 illustrates interactions of a client side 4000 of an information retrieval system (e.g., client device 1004) and a search engine side 4002 of the system (e.g., search engine 1030). As a user enters a search query, the user's input is monitored (4004) by the client side 4000. Prior to the user signaling completion of the search query, a portion of the user's query is sent (4006) from the client side 4000 to the search engine 4002. Additionally, data such as click data (or other types of previously collected information) may also be sent (4006) with the query portion. The portion of the query may be a few characters, a search term, more than one search term, or other combination of characters and terms. In some arrangements, the partial input is in the form of a content location identifier, often referred to as a uniform resource locator (URL) such as that described in RFC 1738, promulgated by the Internet Engineering Task Force, which can be used to identify resources within computers and computer networks. URLs can also be used to identify resources available locally on a computer such as documents, folders or services. A "URL" can be considered any form of content location identifier, for example, Internet addresses, RFC 1738 compliant addresses, and file pathnames (such as the pathnames used by computer systems and local area networks) may be considered "URL's". The search engine 4002 receives (4008) the partial query and the data (e.g., click data) for processing and makes predictions (4010) as to user's contemplated complete query (or URL). In some arrangements, the previously collected information (e.g., click data), or a portion of the data may have been previously stored at the search engine side of the system. As such, relevant information may be retrieved for processing with the received partial query to produce the predictions (4010). In some arrangements, the predictions are ordered in accordance with one or more ranking criteria. For example, in one scenario, queries having a higher frequency of submission are ordered before queries having lower frequencies of submission. The search engine 4002 may use various types of information for ranking and ordering the queries. For example, information associated with previously entered search queries may be used to assist in making ordered predictions. In some arrangements, the previously entered search queries are received by the search engine 4002 or another search engine. Similarly, the previous queries may include search queries associated with the same user, another user, or from a community of users. The predicted queries are sent back (4012) to the client system 4000 and then presented (4014) to the user. Generally, if one of the predicted queries is what the user intended as the desired query, the user may select this predicted query and proceed without having to finish entering the desired query. Alternatively, if the predicted queries do not reflect what the user had in mind, then the user may continue entering the desired search query, thereby triggering one or more other sets of predictions that can be provided to the user. One or more techniques and methodologies associated with query predictions may also be implemented, as described in U.S. Pat. No. 7,487,145, which issued on 3 Feb. 2009, and titled "Method and System for Autocompletion Using Ranking Results", the entire contents of which is herein incorporated by reference.

Figure 5:
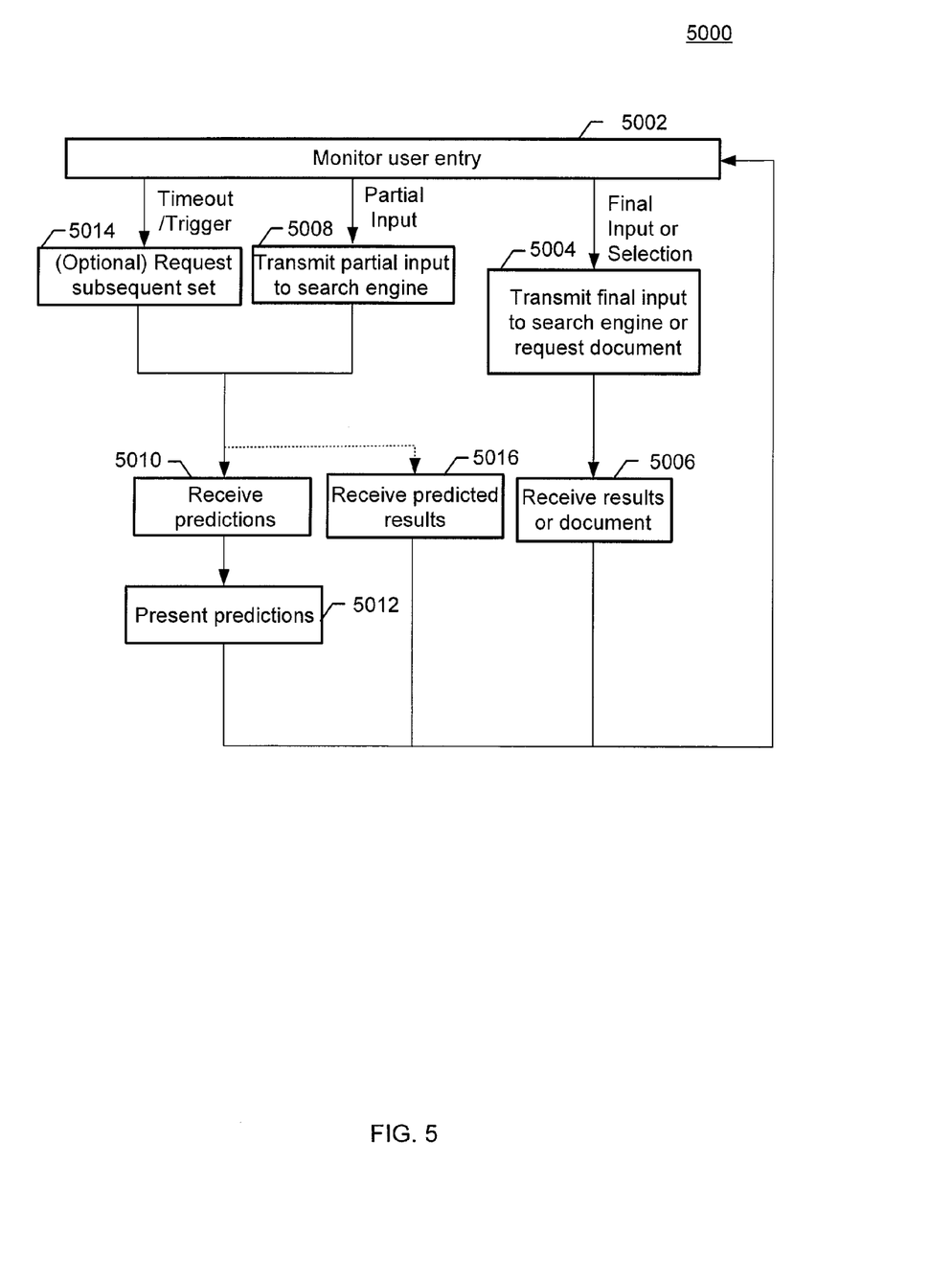
FIG. 5 shows a flowchart of a method for predicting queries with a search assistant.

Referring to FIG. 5, a flowchart 5000 illustrates some operations of a search assistant (e.g., the search assistant 3080 shown in FIG. 3). Operations of the search assistant may include monitoring (5002) the user's entry of a search query e.g., on the client side 4000 (shown in FIG. 4) of an information retrieval system. In some arrangements, the search assistant monitors the user's entry of a uniform resource locator (URL) input string, such as in the address field of a browser window. The user may enter the search query or URL in a number of ways including a browser window, a search tool, or any other input mechanism. In this arrangement, the search assistant may detect and identify three different scenarios. For the first scenario, the search assistant 204 receives or identifies a final input (indicated in the figure as "Final Input or Selection") when the user has indicated completion of the input string or selected a presented prediction. In the second scenario, the search assistant receives or identifies a partial input (indicated in the figure as "Partial Input") when an input is identified prior to when the user indicates completion of the input string. In a third scenario, an optional scenario, the search assistant determines or receives notification that the user has not selected one of the predictions within a specified time period (indicated in the figure as "Timeout/Trigger").

For the first scenario, when a final input or selection is identified as a search query, operations may include transmitting (5004) the input to a search engine (e.g., search engine 1030) for processing. Additionally, tracked information (e.g., from the tracking component 3020 and the result selection log(s) 3030) may be collected and transmitted to the search engine. Such information may retrieved from the search engine side of the information retrieval system (e.g., server system 1014). The search engine returns a set of search results, which is received (5006) by the search assistant. In some arrangements, the search may first be received by a client application, such as a browser application, and corresponding provided to the search assistant for receipt. The list of search results is presented to the user such that the user may select one of the documents for further examination (e.g., visually or aurally). For the situation in which the final input is a URL, the request is transmitted (5004) to the appropriate document host and the document, if available, is returned (5006). Once the response is received (5006), operations include returning to monitoring (5002) the user's input activities. In some arrangements, the URL request is sent to the search engine for logging and the request is redirected to the appropriate document host. Such requests, along with user entry information may collected (e.g., by the tracking component 3020) and stored (e.g., in the result selection logs 3030) for later retrieval and use.

Various techniques and methodologies may be implemented by the search assistant to identify a final input. For example, a final input may be identified when the user enters a carriage return, or equivalent character, selects a search button in a graphical user interface (GUI) presented to the user during entry of the search query, selecting one of a set of possible queries presented to the user during entry of the search query, or other similar event to signal the final entry of the search query.

Typically, prior to the user signaling a final input, a partial input may be identified by monitoring the user entry. A partial input may be identified by implementing one or more methodologies and techniques. For example, for a search query, a partial input may include a single search term of the search query, multiple search terms, or a predefined a number of characters of a search term. Further in some arrangements, a partial input may be identified by detecting entry of a delimiter or another character (e.g., a quote character, a period, a parenthesis character, a slash character, arrow key detection or tab entry). Entry of a delimiting character may indicate that a user has finished entering a desired term or portion of the input and is progressing to the next search term or portion.

In some arrangements, a partial input may be identified by detecting entry of a predetermined number of characters. In such arrangements, the input contains a number of characters less than a full input, but it may be desirable to identify the partial input before the user has entered all of the characters. Such a technique may be advantageous, for example, in instances when the search term or URL contains a large number of characters or when the pre-determined number of characters is large enough to provide useful predictions. A partial input may also be identified, for example, by detecting the absence of a character being entered within a period of time, the absence representing a pause by the user. Such as pause may signify that the user has entered one search term or portion of the complete string but has not entered the character representing a space (or other delimiting character) to start entering another term or signify that the search query is in fact complete.

Regardless of the methodology implemented, upon identifying the partial input, operations include transmitting (5008) the partial input to a search engine (e.g., search engine 1030) for processing. Similarly, tracked information (e.g., from the tracking component 3020 and the result selection log(s) 3030) may be also be transmitted. In response to the partial search query, the search engine returns a set of ordered predicted search queries and/or URLs that are received (5010) and presented (5012) to the user ordered in accordance with a ranking criteria. Various techniques may be used to display the predictions, for example, the predictions could be displayed in a drop-down window, a persistent, or non-persistent window or by using other graphical techniques. In some arrangements, queries previously submitted by the user may be visually indicated (e.g., by highlighting the user's own previously entered queries).

Various techniques and methodologies may be used for ranking and ordering the predicted search queries. For example, the predicted search queries may be ordered in accordance with a frequency of submission by a community of users. Time constraints may also be used, for example, search queries may be ordered, at least in part, in accordance with a last time/date value that the query was submitted. Search queries may also be ordered in accordance with personalization information, such as user personalization information or community information. For example, user personalization information may include information about subjects, concepts or categories of information that are of interest to the user. The user personalization information may be provided directly by the user, or may be inferred (e.g., with the user's permission) from the user's prior search or browsing activities, or may be based at least in part on information about a group associated with the user or to which the user belongs (e.g., as a member, or as an employee). The set of predicted search queries may be initially ordered in accordance with a first ranking criteria, such as predefined popularity criteria, and then reordered if any of the predicted search queries match the user personalization information of the user so as to place the matching predicted search queries at or closer to the top of the ordered set of predicted search queries. In some arrangements information provided by the tracking component 3020 and the result selection log(s) 3030 may be used for ranking and ordering the predicted search queries. For example, click data, language-specific, and country-specific data may be used. Processed click data (e.g., aggregated click data for a given query) may be used for ranking and ordering the predicted search queries. For example, for each query a score may be calculated by summing click data (e.g., weighted clicks, etc.) on documents associated with the query, and predicted queries may be ordered based upon the score (e.g., higher values representing better).

Similar to the predicted search queries, one or more techniques may be used to present URLs (individually or in combination with the predicted search queries) to the user. For example, the predicted search queries and/or URLs might be presented in a drop down menu. Regardless of the manner in which the predicted queries and/or URLs are presented to the user, the user may select one of the queries and/or URLs if the user determines that one of the predictions matches the intended entry. In some instances, the predictions may provide the user with additional information which had not been considered. For example, a user may have one query in mind as part of a search strategy, but seeing the predicted results causes the user to alter the input strategy. Once the set is presented (5012), the user's input is again monitored (5002). If the user selects one of the predictions (as indicated by the "Final Input or Selection" path), the request is transmitted (5004) either to the search engine (e.g., the search engine 1030) as a search request or to a resource host as a URL request, as applicable. After the request is transmitted, the user's input activities are again monitored (5002). In some arrangements, the URL request may transmitted to search engine 208 for logging purposes or logged locally or logged in combination.

If the user has not selected one of the predictions within a specified time period, then it is probable that the user did not find a satisfactory prediction in the initially retuned predictions. For example, a user's intended input may not have attained a high enough ranking value to be included in the set of ordered predictions. Accordingly, in some optional arrangements, if the user has not selected one of the predictions within a specified period of time (e.g., 5 or 10 seconds) (as indicted by the "Timeout/Trigger" path), then a request is sent (5014) to the search engine for another set of predictions. The subsequent set of predictions could include predictions having ranking values lower than the set previously submitted. Alternately, a second set of criteria may be used to identify predictions in the second set, where the second set of criteria are different than a first set of criteria used to select and rank the first set of predictions. For instance, one of the two sets may use selection criteria that takes into account personal information about the requestor while the other set does not account for such personal information. In some optional arrangements, other triggers may be implemented to request one or more sets of subsequent predictions. For example, a user-initiated activity (e.g., pressing the "tab" key, an arrow key, a function key, and the like) may cause a request for a subsequent set. In some arrangements, information associated with a search requestor is maintained at the server system (e.g., the server system 1014) to identify which predicted results have already been conveyed to the search requestor. In some arrangements, information is included in the request for a subsequent request that indicates which results have already been conveyed to the search requestor. In one such arrangement the server system uses this information to exclude from subsequently predicted results either all of the previously predicted results or a subset of the previously predicted results. In another arrangement, the information associated with previously predicted results is used by the server system to produce additional or different results only if the server system is able to identify additional predicted results that match the requestor's partial query. In some arrangements, triggering a subsequent set of predictions causes predictions to be made using a search requestor's search queries stored locally, while in other embodiments the subsequent set of predictions includes both predictions generated based on historical queries of a community of users and the search requestor's historical search queries, if any, that match the requestor's partial query.

One or more sets of predicted results may be cached locally at the client side (e.g., client device 1004) of the system. When the search requestor modifies the current query to reflect an earlier partial input (e.g., by backspacing to remove some characters), the set of predicted results associated with the earlier partial input may be retrieved from the client cache and again presented again to the user instead of the partial input being sent to the search engine.

In some arrangements, operations may also include optionally receiving (5016) predicted results returned by the search engine (e.g., search engine 1030). This activity may overlap with receiving (5010) the predictions and is indicated by a dashed line in the figure. The predicted results may be presented and the monitoring (5002) of the user resumes. The presentation to the user can be accomplished by using one or more techniques. For example, the results can be displayed in a portion of a non-persistent window, a pop-up window, or in a portion of the current display or a portion of a user interface. The web page used for entry of the query and for presenting predicted results may include JavaScript or other embedded code or instructions to facilitate the display of the predicted results and to respond to user selection of any of the predicted results. In general, the predicted results correspond to documents or information that would have been returned based on the request being one or more of the predicted queries or URLs. In some arrangements, the predicted results include snippets of the content at one or more locations corresponding to the predicted results. The predicted results may also include one or more thumbnails of one or more web pages or other content at one or more locations corresponding to the predicted results. In some arrangements, the results are search results based on one or more of the predicted queries. For example, the results presented may be one or more documents relevant to one or more of the predicted queries or predicted URLs. Accordingly, the user may have predicted results presented that match a desired request before the user finishes entering the request (e.g., search request or URL request). In such situations, the processing latency as viewed by the user is effectively reduced to less than zero because the user did not have to complete the input to obtain the desired result.

Figure 6:
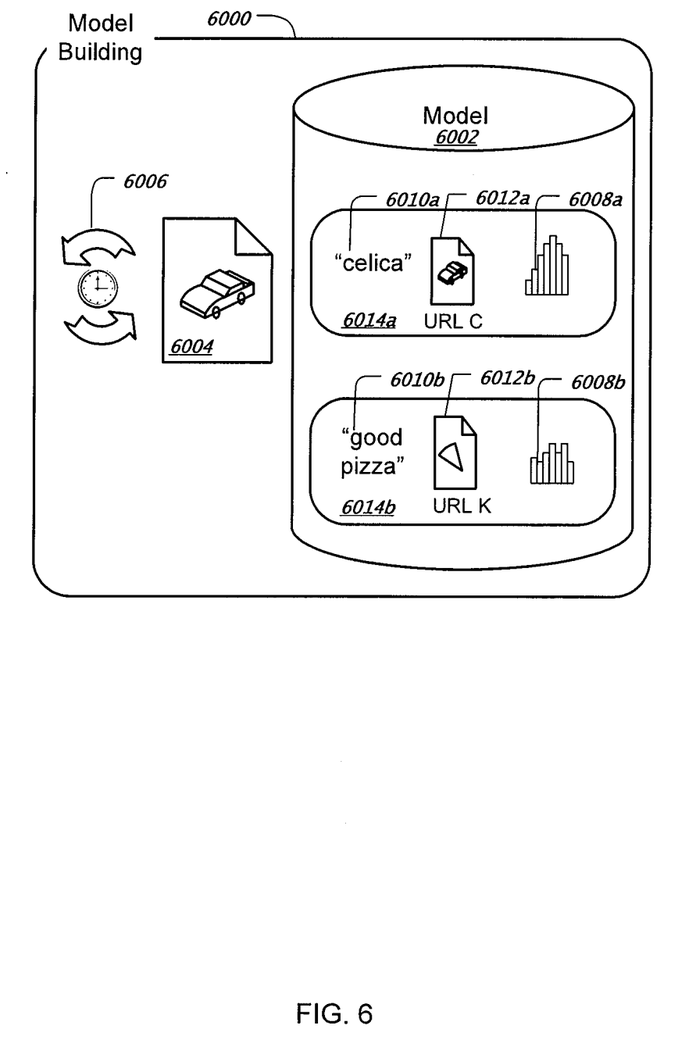
FIG. 6 shows a diagram illustrating a search information model.

Referring to FIG. 6, a diagram 6000 illustrates an exemplary information model 6002 of previously submitted query data that can be used with the partial query data to obtain predictions. In some arrangements, such a model may reside on the client side (e.g., the results selection log(s) 3030) or the server side (e.g., server system 3050) of a information retrieval system. In some arrangements, the model 6000 is one or more databases that aggregate information indicative of user behavior on at least a per query and per document basis. The model 6002 information can be used as input to a process to enhance provided predictions. For example, the model 6002 information can be used as input to interactive or non interactive Internet search engines (e.g., search engine 1030), image search engines, video search engines, book search engines, consumer product search engines, other suitable processes used for predicting search results from partial user input. The model 6002 may also be used to provide information to enhance searches based upon complete user query or other processes such as ranking and ordering search results (e.g., ranking documents).

In various implementations, the model 6002 can be built as users interact with search engines (e.g., provided by the tracking component 2050). For example, a timer can track how long a user views or "dwells" on a document 6004. The amount of time 6006 is referred to as "click data". For example, a longer time spent dwelling on a document, termed a "long click", can indicate that a user found the document to be relevant for their query. A brief period viewing a document, termed a "short click", can be interpreted as a lack of document relevance. In various implementations, the click data 6008 is a count of each click type (e.g., long, medium, short) for a particular query 6010 and document 6012 combination. Aggregated click data from model queries for a given document can be used to create a quality of result statistic for that document and can be used to enhance a ranking of that document. By way of illustration, a quality of result statistic can be a weighted average of the count of long clicks for a given document and query.

A search engine (e.g., the search engine 1030) or other process may create a record 6014 in the model 6002 for documents that are selected by users in response to a query or a partial query. Each record 6014 within the model 6002 (herein referred to as a tuple: <document, query, data>) is at least a combination of a query 6010 submitted by users, a document reference 6012 selected by users in response to that query, and an aggregation of click data 6008 for all users that select the document reference 6012 in response to the query 6010. The aggregate click data can be viewed as an indication of document relevance. In various implementations, model data can be location-specific (e.g. country, state, etc) or language-specific. For example, a country-specific tuple would include the country from where the user query originated from in whereas a language-specific tuple would include the language of the user query. Other extensions of model data are possible.

With reference to FIG. 3, model information may be provided by the tracking component 3020 and the log(s) 3030. Such information may be associated with individual selections of document results tracked within the context of a search query for which the document results are returned. For example, in the context of a web based information retrieval system, user's click data on web page search results can be gathered and stored, which can be kept for all user queries. When a user clicks on a search result, the click can be tracked via JavaScript code embedded in the search results page, an embedded browser tag, etc. This code can track when and on what a user clicks in the main search results page, and can track when the user returns to that main page.

Post-click behavior can also be tracked by the tracking component 3020 (e.g., via pre-installed software such as a toolbar plug-in). Provided the user opts into fully sharing their browsing behavior, the tracking component 3020 can track all the pages that the user visits, both before and after the search results page is delivered.

The information gathered for each click can include: (1) the query (Q) the user entered, (2) the document result (D) the user clicked on, (3) the time (T) on the document, (4) the interface language (L) (which can be given by the user), (5) the country (C) of the user (which can be identified by the host that they use, such as www-store-co-uk to indicate the United Kingdom), and (6) additional aspects of the user and session. The time (T) can be measured as the time between the initial click through to the document result until the time the user comes back to the main page and clicks on another document result. Moreover, an assessment can be made about the time (T) regarding whether this time indicates a longer view of the document result or a shorter view of the document result, since longer views are generally indicative of quality for the clicked through result. This assessment about the time (T) can further be made in conjunction with various weighting techniques.

Document views resulting from the selections can be weighted based on viewing length information to produce weighted views of the document result. Thus, rather than simply distinguishing long clicks from short clicks, a wider range of click through viewing times can be included in the assessment of result quality, where longer viewing times in the range are given more weight than shorter viewing times. This weighting can be either continuous or discontinuous.

A continuous function can be applied to the document views resulting from the selections. Thus, the weight given to a particular click through time can fall within a continuous range of values, as defined by the specified function. Alternatively, a discontinuous function can be applied to the document views resulting from the selections. For example, there can be three viewing time categories, each having a corresponding weight. Note that such functions can be explicitly defined, or merely implicit in the software implementation.

In the case of discontinuous weighting, the individual selections of the document result can be classified into viewing time categories, and weights can be assigned to the individual selections based on results of the classifying. For example, a short click can be considered indicative of a poor page and thus given a low weight (e.g., −0.1 per click), a medium click can be considered indicative of a potentially good page and thus given a slightly higher weight (e.g., 0.5 per click), a long click can be considered indicative of a good page and thus given a much higher weight (e.g., 1.0 per click), and a last click (where the user doesn't return to the main page) can be considered as likely indicative of a good page and thus given a fairly high weight (e.g., 0.9). Note that the click weighting can also be adjusted based on previous click information. For example, if another click preceded the last click, the last click can be considered as less indicative of a good page and given only a moderate weight (e.g., 0.3 per click).

The various time frames used to classify short, medium and long clicks, and the weights to apply, can be determined for a given search engine by comparing historical data from user selection logs with human generated explicit feedback on the quality of search results for various given queries, and the weighting process can be tuned accordingly. Furthermore, these time frames and weights can be adjusted based on one or more viewing length differentiators. Measures of relevance, and click fractions and similar quantities may also be employed. For example, traditional click fractions that employ per-language and per-country fractions may be used. Another click fraction can be used which can consider the quality of a search result, irrespective of other results of the query. This fraction, referred to as Long Click Count (LCC), can provide an indication of the percentage of clicks on a document that are categorized as "long clicks", as described in U.S. patent application Ser. No. 11/841,313, titled "Modifying Search Result Ranking Based on Populations", the entire contents of which is herein incorporated by reference.

Figure 7:
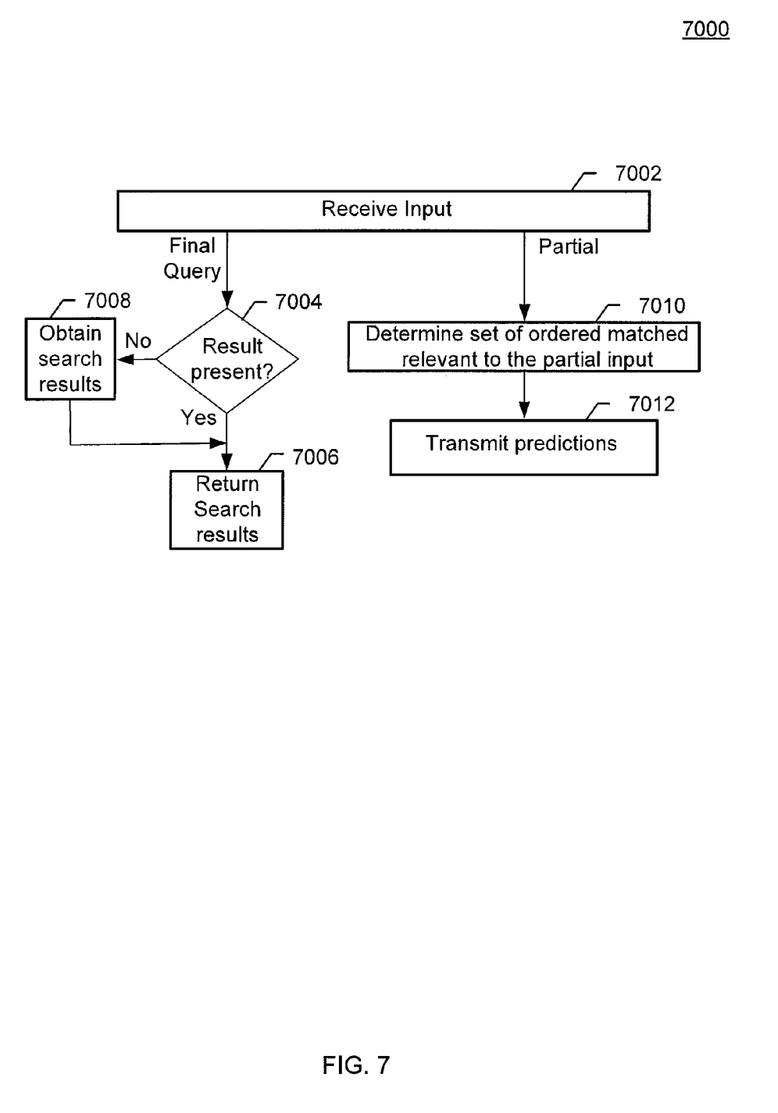
FIG. 7 shows a flowchart of a method for producing query predictions and search results.

Referring to FIG. 7, a flowchart 7000 illustrates some operations and activities occurring in a search engine (e.g., search engine 1030) based upon received input (e.g., from the search assistant 3080, the tracking component 3020, the result selection log(s) 3030, etc.). The search engine receives the input and determines (7002) whether the input indicates a final input or a partial input. If the search engine determines that the received input is a final query (as indicated by the "Final Query" path), operation include determining (7004) whether search results relevant to the query are present (e.g., currently stored). If the relevant search results are present, the results are returned (7006) to the client side (e.g., a client device). Alternatively, if the search results are absent, operations include obtaining (7008) the search results relevant to the query. In some arrangements, a URL request, when complete, is not received by the search engine 208 because a search assistant (e.g., the search assistant 3080) sends the request to a resource host. In some arrangements, the URL request is received by the search engine for tracking purposes (such as storage in a URL database) and the request is redirected to the resource host by the search engine.

If the search engine determines that the received input was a partial input (as indicated by the "Partial" path), operations include determining (7010) a set of ordered matches that correspond to the partial input, and transmitting (7012) the set to the client side (e.g., the client device 1004). In some arrangements, the set of ordered matches sent to the client side is one of many pre-computed sets of ordered matches. While the operations of flowchart 7000 have been described with respect to a partial query and data such as click data, similar techniques are equally applicable to partial inputs of URLs. In some scenarios, the set of ordered matches returned may be relevant to queries, URLs, or to both queries and URLs.

Figure 8:
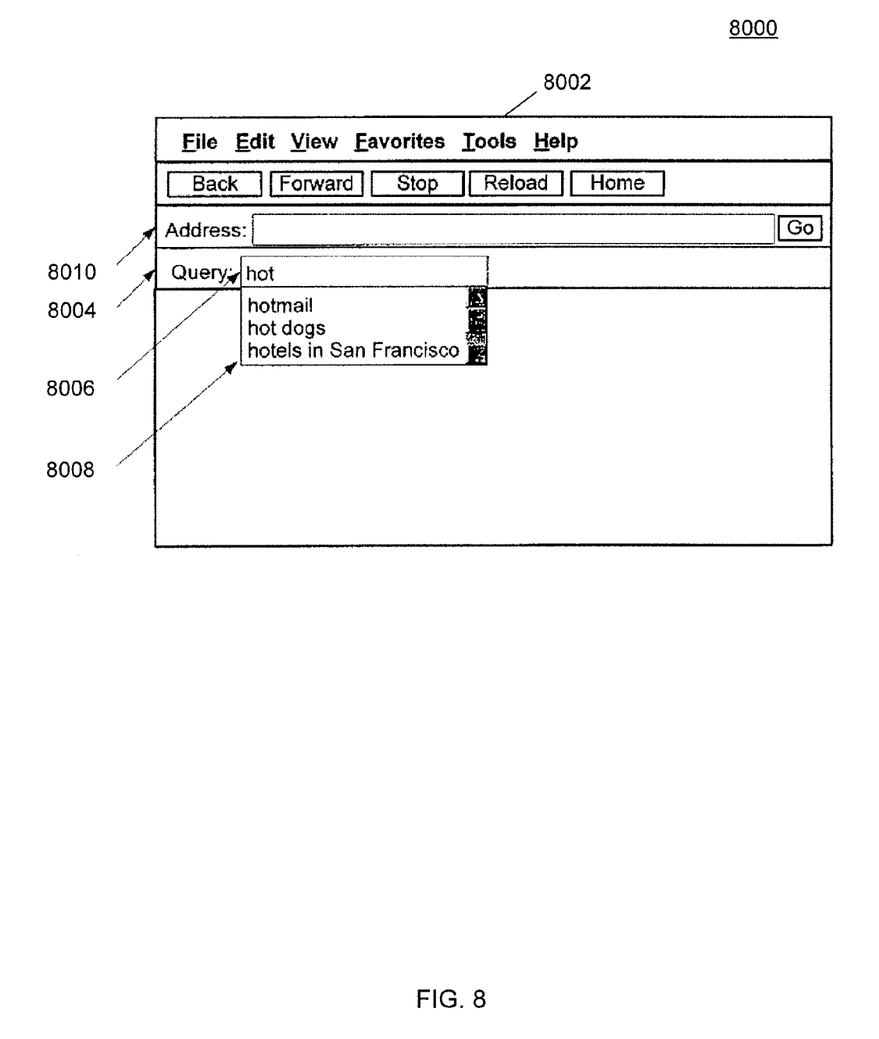
FIG. 8 shows an exemplary interface for search requestor queries.

Referring to 8, a graphical interface 8000 is shown that illustrates a user's view of a browser capable of providing predictions based upon a partial query (input by the user) and tracked information. In this particular arrangement, a browser 8002 includes a toolbar 8004 that includes a text entry box 8006 depicting the entry of a partial query <hot>. In response to detecting the partial query and ultimately receiving the predicted queries (e.g., from the server system 1014), the predictions are displayed in display area 8008 (e.g., a drop down menu) for possible selection by the user. Similarly, although not demonstrated in this illustration, in response to detecting user entry of a partial URL in an address bar 8010, an ordered set of predicted URLs may be displayed in a display area (not shown) immediately below or adjacent the address bar 8010 for possible selection by the user.

Along with providing the predictions (e.g., predicted queries, predicted URL's), additionally information associated with the predictions may be provided for user viewing. For example, data associated with the ranking and ordering of the predictions may be provided to presented. In one arrangement, such data may be presented adjacent to the respective predictions to provide, for example, the viewer a measure of predictability that links the partial query and each prediction.

Figure 9:
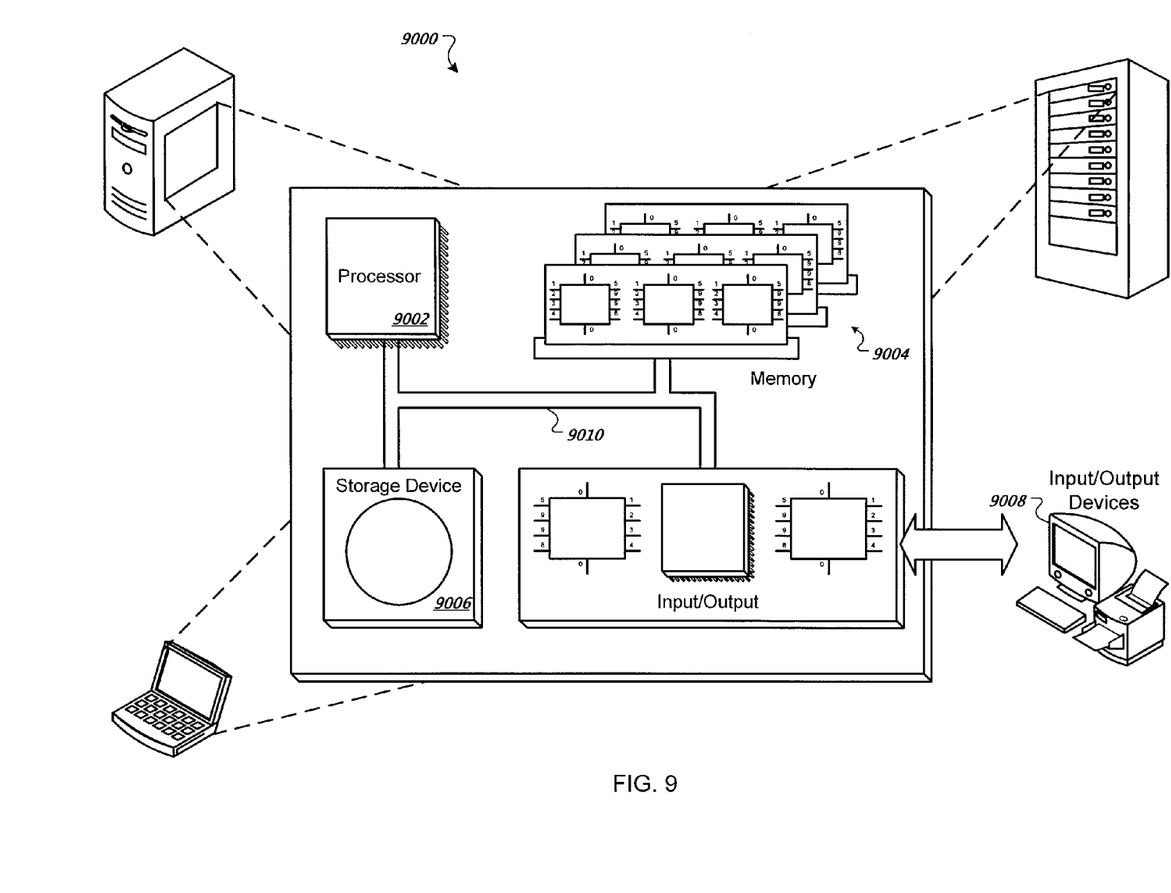
FIG. 9 shows a schematic diagram of an example computer system.

FIG. 9 is a schematic diagram of an example computer system 9000. The system 9000 can be used for practicing operations described above. The system 9000 can include a processor 9002, a memory 9004, a storage device 9006, and input/output devices 9008. Each of the components 9002, 9004, 9006, and 9008 are interconnected using a system bus 9010. The processor 9002 is capable of processing instructions within the system 9000. These instructions can implement one or more aspects of the systems, components and techniques described above. In some implementations, the processor 9002 is a single-threaded processor. In other implementations, the processor 9002 is a multi-threaded processor. The processor 9002 can include multiple processing cores and is capable of processing instructions stored in the memory 9004 or on the storage device 9006 to display graphical information for a user interface on the input/output device 9008.

The memory 9004 is a computer readable medium such as volatile or non volatile that stores information within the system 9000. The memory 9004 can store processes related to the functionality of the search engine 1030, for example. The storage device 9006 is capable of providing persistent storage for the system 9000. The storage device 9006 can include a floppy disk device, a hard disk device, an optical disk device, or a tape device, or other suitable persistent storage mediums. The storage device 9006 can store the various databases described above. The input/output device 9008 provides input/output operations for the system 9000. The input/output device 9008 can include a keyboard, a pointing device, and a display unit for displaying graphical user interfaces.

The computer system shown in FIG. 9 is but one example. In general, embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, the server environment, which is configured to provide electronic search service and employ the ranking systems and techniques described, need not be implemented using traditional back-end or middleware components. The server environment can be implemented using a program installed on a personal computing apparatus and used for electronic search of local files, or the server environment can be implemented using a search appliance installed in an enterprise network.

Other implicit user feedback models can be used in place of the traditional click fraction model described. For example, an implicit user feedback model employing a large-scale logistic regression model that uses the actual query and url as features can be used. The new prior models can be used to denormalize any query-specific click model.

In addition, the prior model(s) can be applied in varying manners. For example, a prior model can be applied at run time as an adjustment to the ranking boost given to a document in accordance with the implicit user feedback model since the set of features used for the prior model can be available for direct input at run time. Alternatively, the prior model can be applied at model building time, where features are fetched from the log(s), which can result in improved response time during searches. In addition, when the model is applied at building time, the implicit feedback can be adjusted per each click record before aggregating the feedback from multiple clicks into a signal. This adjustment can be for instance a weighting of the clicks according to how much they were affected by display bias before the clicks are aggregated. At run time, the signal is typically only adjusted after the clicks were already aggregated, which can result in some loss of precision.

What is claimed is:

1. A computer-implemented method for processing query information, comprising:

receiving query information at a server system, wherein the query information includes a portion of a query from a search requestor, the query information being received prior to receiving data indicating that the search requestor has completed the query and the portion of the query from the search requestor being only a portion of a final query;

obtaining a set of predicted queries relevant to the portion of the query from the search requestor based upon the portion of the query from the search requestor and data indicative of search requestor behavior relative to previously submitted queries, wherein the set of predicted queries includes two or more predicted queries, and each predicted query is a prediction of a possible final query of the search requestor and wherein each predicted query includes the portion of the query and is different from each other query;

ranking the predicted queries in the set of predicted queries according to a ranking criteria;

providing the ranked set of predicted queries for display to the search requestor;

determining whether an input is received from the search requestor selecting a predicted query, of the ranked set of predicted queries displayed to the search requestor, within a specified time;

in response to a determination that the input from the search requestor selecting a displayed predicted query is not received within the specified time:

obtaining a subsequent ranked set of predicted queries for the portion of the query from the search requestor, the predicted queries in the subsequent ranked set of predicted queries being ranked according to different criteria than the predicted queries in the ranked set of predicted queries; and providing the subsequent ranked set of predicted queries for display to the search requestor in response to receiving the query information.

2. The computer-implemented method of claim 1, wherein obtaining the set of predicted queries includes ordering the set of predicted queries based upon a ranking criteria.

3. The computer-implemented method of claim 2, wherein the ranking criteria is based upon the data indicative of search requestor behavior relative to previously submitted queries.

4. The computer-implemented method of claim 1, wherein the data indicative of search requestor behavior relative to previously submitted queries includes click data.

5. The computer-implemented method of claim 1, wherein the data indicative of search requestor behavior relative to previously submitted queries includes location-specific data.

6. The computer-implemented method of claim 1, wherein the data indicative of search requestor behavior relative to previously submitted queries includes language-specific data.

7. The computer-implemented method of claim 1, further comprising:

receiving input from the search requestor identifying a selected query from the subsequent ranked set of predicted queries;

obtaining search results based upon the selected query; and providing the search results to the search requestor.

8. The computer-implemented method of claim 1, wherein the portion of the query from the search requestor is defined by at least one delimiter.

9. The computer-implemented method of claim 1, wherein the portion of the query from the search requestor is defined by at least one search term.

10. The computer-implemented method of claim 1, wherein the portion of the query from the search requestor is defined by a predefined number of characters.

11. The computer-implemented method of claim 1, wherein:

the ranking criteria includes predefined popularity criteria for each predicted query of the ranked set of predicted queries for a plurality of search requestors; and the different criteria includes information about the search requestor.

12. The computer-implemented method of claim 1, further comprising excluding each predicted query of the ranked set of predicted queries from the subsequent ranked set of predicted queries.

13. A computer program product, encoded on a non-transitory computer-readable medium, operable to cause data processing apparatus to perform operations comprising:

receiving query information at a server system, wherein the query information includes a portion of a query from a search requestor, the query information being received prior to receiving data indicating that the search requestor has completed the query and the portion of the query from the search requestor being only a portion of a final query;

obtaining a set of predicted queries relevant to the portion of the query from the search requestor based upon the portion of the query from the search requestor and data indicative of search requestor behavior relative to previously submitted queries, wherein the set of predicted queries includes two or more predicted queries, and each predicted query is a prediction of a possible final query of the search requestor and wherein each predicted query includes the portion of the query and is different from each other query;

ranking the predicted queries in the set of predicted queries according to a ranking criteria;

providing the ranked set of predicted queries for display to the search requestor;

determining whether an input is received from the search requestor selecting a predicted query, of the ranked set of predicted queries displayed to the search requestor, within a specified time;

in response to a determination that the input from the search requestor selecting a displayed predicted query is not received within the specified time:

obtaining a subsequent ranked set of predicted queries for the portion of the query from the search requestor, the predicted queries in the subsequent ranked set of predicted queries being ranked according to different criteria than the predicted queries in the ranked set of predicted queries; and providing the subsequent ranked set of predicted queries for display to the search requestor in response to receiving the query information.

14. The computer program product of claim 13, wherein obtaining the set of predicted queries includes ordering the set of predicted queries based upon a ranking criteria.

15. The computer program product of claim 14, wherein the ranking criteria is based upon the data indicative of search requestor behavior relative to previously submitted queries.

16. The computer program product of claim 13, wherein the data indicative of search requestor behavior relative to previously submitted queries includes click data.

17. The computer program product of claim 13, wherein the data indicative of search requestor behavior relative to previously submitted queries includes location-specific data.

18. The computer program product of claim 13, wherein the data indicative of search requestor behavior relative to previously submitted queries includes language-specific data.

19. The computer program product of claim 13, further operable to cause data processing apparatus to perform operations comprising:
receiving input from the search requestor identifying a selected query from the subsequent ranked set of predicted queries;
obtaining search results based upon the selected query; and
providing the search results to the search requestor.

20. The computer program product of claim 13, wherein the portion of the query from the search requestor is defined by at least one delimiter.

21. The computer program product of claim 13, wherein the portion of the query from the search requestor is defined by at least one search term.

22. The computer program product of claim 13, wherein the portion of the query from the search requestor is defined by a predefined number of characters.

23. A system comprising:
one or more computers operable to perform operations comprising:
receiving query information, wherein the query information includes a portion of a query from the search requestor, the query information being received prior to receiving data indicating that the search requestor has completed the query and the portion of the query from the search requestor being only a portion of a final query;
obtaining a set of predicted queries relevant to the portion of the query from the search requestor based upon the portion of the query from the search requestor and data indicative of search requestor behavior relative to previously submitted queries, wherein the set of predicted queries includes two or more predicted queries, and each predicted query is a prediction of a possible final query of the search requestor and wherein each predicted query includes the portion of the query and is different from each other query;
ranking the predicted queries in the set of predicted queries according to a ranking criteria;
providing the ranked set of predicted queries for display to the search requestor
determining whether an input is received from the search requestor selecting a predicted query, of the ranked set of predicted queries displayed to the search requestor, within a specified time;
in response to a determination that the input from the search requestor selecting a displayed predicted query is not received within the specified time:
obtaining a subsequent ranked set of predicted queries for the portion of the query from the search requestor, the predicted queries in the subsequent ranked set of predicted queries being ranked according to different criteria than the predicted queries in the ranked set of predicted queries; and
providing the subsequent ranked set of predicted queries for display to the search requestor in response to receiving the query information.

24. The system of claim 23, wherein obtaining the set of predicted queries includes ordering the set of predicted queries based upon a ranking criteria.

25. The system of claim 24, wherein the ranking criteria is based upon the data indicative of search requestor behavior relative to previously submitted queries.

26. The system of claim 23, wherein the data indicative of search requestor behavior relative to previously submitted queries includes click data.

27. The system of claim 23, wherein the data indicative of search requestor behavior relative to previously submitted queries includes location-specific data.

28. The system of claim 23, wherein the data indicative of search requestor behavior relative to previously submitted queries includes language-specific data.

29. The system of claim 23, wherein the one or more computers are further operable to perform operations comprising:
receiving input from the search requestor identifying a selected query from the subsequent ranked set of predicted queries;
obtaining search results based upon the selected query; and
providing the search results to the search requestor.

30. The system of claim 23, wherein the portion of the query from the search requestor is defined by at least one delimiter.

31. The system of claim 23, wherein the portion of the query from the search requestor is defined by at least one search term.

32. The system of claim 23, wherein the portion of the query from the search requestor is defined by a predefined number of characters.

* * * * *